United States Patent
Goel et al.

(10) Patent No.: US 9,298,933 B2
(45) Date of Patent: Mar. 29, 2016

(54) AUTONOMOUS ROLE-BASED SECURITY FOR DATABASE MANAGEMENT SYSTEMS

(71) Applicants: Anil Goel, Waterloo (CA); Asif Iqbal Desai, Pune (IN); Ramesh Gupta, Pune (IN); Somnath Ghosh, Pune (IN); Harin Vadodaria, Pune (IN)

(72) Inventors: Anil Goel, Waterloo (CA); Asif Iqbal Desai, Pune (IN); Ramesh Gupta, Pune (IN); Somnath Ghosh, Pune (IN); Harin Vadodaria, Pune (IN)

(73) Assignee: Sybase, Inc., Dublin, CA (US)

( * ) Notice: Subject to any disclaimer, the term of this patent is extended or adjusted under 35 U.S.C. 154(b) by 284 days.

(21) Appl. No.: 13/945,148

(22) Filed: Jul. 18, 2013

(65) Prior Publication Data

US 2015/0026215 A1 Jan. 22, 2015

(51) Int. Cl.
*G06F 17/30* (2006.01)
*G06F 21/60* (2013.01)
*G06F 21/62* (2013.01)

(52) U.S. Cl.
CPC .......... *G06F 21/604* (2013.01); *G06F 21/6218* (2013.01)

(58) Field of Classification Search
CPC .......................... G06F 21/6218; G06F 21/6227
USPC ................. 707/781–788; 726/2, 27; 709/229; 713/182
See application file for complete search history.

(56) References Cited

U.S. PATENT DOCUMENTS

| | | | |
|---|---|---|---|
| 6,161,139 A | 12/2000 | Win et al. | |
| 7,120,635 B2 | 10/2006 | Bhide et al. | |
| 7,200,869 B1 | 4/2007 | Hacherl et al. | |
| 7,225,256 B2 | 5/2007 | Villavicencio | |
| 7,308,704 B2 | 12/2007 | Vogel et al. | |
| 7,350,237 B2 | 3/2008 | Vogel et al. | |
| 7,404,203 B2* | 7/2008 | Ng .................... | 726/6 |
| 7,461,395 B2 | 12/2008 | Ng | |
| 7,593,942 B2 | 9/2009 | Sack et al. | |
| 7,650,644 B2 | 1/2010 | Cheng et al. | |
| 7,827,606 B2 | 11/2010 | Rits et al. | |
| 7,860,888 B2 | 12/2010 | Buchholz et al. | |
| 8,117,643 B2 | 2/2012 | Vidya et al. | |
| 8,661,555 B2 | 2/2014 | Miseldine | |
| 9,122,644 B2* | 9/2015 | Kruglikov et al. | |
| 2001/0056494 A1* | 12/2001 | Trabelsi ........................ | 709/229 |
| 2004/0225896 A1* | 11/2004 | Ng ................ | 713/201 |
| 2005/0138031 A1 | 6/2005 | Wefers | |
| 2006/0101019 A1* | 5/2006 | Nelson et al. ..................... | 707/9 |
| 2007/0282843 A1* | 12/2007 | Beck ................................ | 707/9 |
| 2014/0095546 A1* | 4/2014 | Kruglikov et al. ............ | 707/784 |

OTHER PUBLICATIONS

Thomas R, Role-Based Access Control and Distributed Object-Based Enterprise Computing, 1996, ACM, 4 pages.*

* cited by examiner

*Primary Examiner* — Jean B Fleurantin
(74) *Attorney, Agent, or Firm* — Sterne, Kessler, Goldstein & Fox P.L.L.C.

(57) ABSTRACT

Embodiments described herein generally relate to creating an autonomous role-based security system for a database management system, wherein a super user may not always be required. A computer-implemented method is described. The method includes establishing one or more privileges in a database system, each privilege controlling access to an administrative function for the database system. Each privilege is assigned to one or more roles. Each role may always have a minimum set of users with only administrative rights over the role. A request is received from a first user to grant a role to a second user. A database management system determines whether the first user has administrative privileges over the role. If the first user has administrative privileges over the role, the role is granted to the second user. The database system may satisfy the principles of least privilege and separation of duties.

18 Claims, 5 Drawing Sheets

AUTONOMOUS ROLE-BASED SECURITY FOR DATABASE MANAGEMENT SYSTEMS

BACKGROUND

1. Field

Embodiments described herein generally relate to access control for database management systems, and more particularly to controlling privileges in a database management system.

2. Background

Most database management systems are administered by a small set of privileged users, sometimes referred to as super users. These super users are typically granted various privileges needed to administer a database, such as the privilege to create a table in the database, or the privilege to remove a user's access to the database. The union of all super users' privileges represents all administrative privileges in a database management system.

Many database management systems also include a database administrator (DBA) account, with unlimited power over the database. The DBA often possesses the privilege to reset a user's password. The DBA also possesses the privilege to impersonate another user's account. Although these permissions are very useful, if the DBA account or administrator is unavailable, these functions cannot be performed. Additionally, in some instances, a particular user may only need a subset of the functionality possessed by the DBA account, but granting the full functionality of the DBA account may present a security risk.

BRIEF SUMMARY

Briefly stated, embodiments include system, method, and computer program product embodiments, and combinations and sub-combinations thereof, for an autonomous role-based security method and system for a database management system.

in an embodiment, a computer-implemented method is disclosed. The method includes establishing one or more privileges in a database system, each privilege controlling access to an administrative function for the database system. The method further includes assigning each privilege to one or more roles. A request is received from a first user to grant a role to a second user. The method further includes determining whether the first user has administrative rights over the role. The method further includes granting the role to the second user, when the first user is determined to have administrative rights over the role.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form part of the specification, illustrate various exemplary embodiments and, together with the description, further serve to explain various underlying principles and enable a person skilled in the relevant art to make and use the disclosed embodiments.

The following description makes reference to the accompanying drawings. Generally, like reference numbers indicate identical and/or functionally similar elements. Additionally, in general, the left-most digit of a reference number will identify the drawing in which the reference number first appears.

DETAILED DESCRIPTION

Introduction

The following detailed description refers to the accompanying drawings to illustrate various exemplary embodiments. Other embodiments are possible, and modifications can be made to the embodiments within the spirit and scope of this disclosure. It will be apparent to one of skill in the art that such embodiments can be implemented in different embodiments of software, hardware, firmware, and/or processing unit. Any code or syntax used to describe embodiments does not limit such embodiments to specialized hardware, firmware, software, or processing unit capable of executing such code or syntax. Furthermore, the operational behavior of such embodiments will be described herein with the understanding that various modifications and variations of the embodiments are possible.

Any reference to modules in this specification and the claims means any combination of hardware or software components for performing the intended function. A module need not be a rigidly defined entity, such that several modules may overlap hardware and software components in functionality. For example, a module may refer to a single line of code within a procedure, the procedure itself being a separate module. One skilled in the relevant arts will understand that the functionality of modules may be defined in accordance with a number of stylistic or performance-optimizing techniques, for example.

Embodiments provide for creation of an autonomous database management system by extending the ANSI (American National Standards Institute) roles feature. Embodiments allow creation of a set of users who only administer roles, but do not possess the privilege to actually perform the database functions or operations associated with the roles. Accordingly, embodiments provide for a system that does not require the presence of a super user at all times. Moreover, embodiments achieve the principle of least privilege and the principle of separation of duties.

Embodiments also introduce granularity in the privilege or ability to change or reset database user passwords, and the privilege to impersonate other users by allowing the granted user the ability to only exercise the privilege on a specific set of users or users with a specific role. Embodiments also prevent a complete lockdown of role administration in the event of a role administrator's account being locked.

Database Permissions

Figure 1:
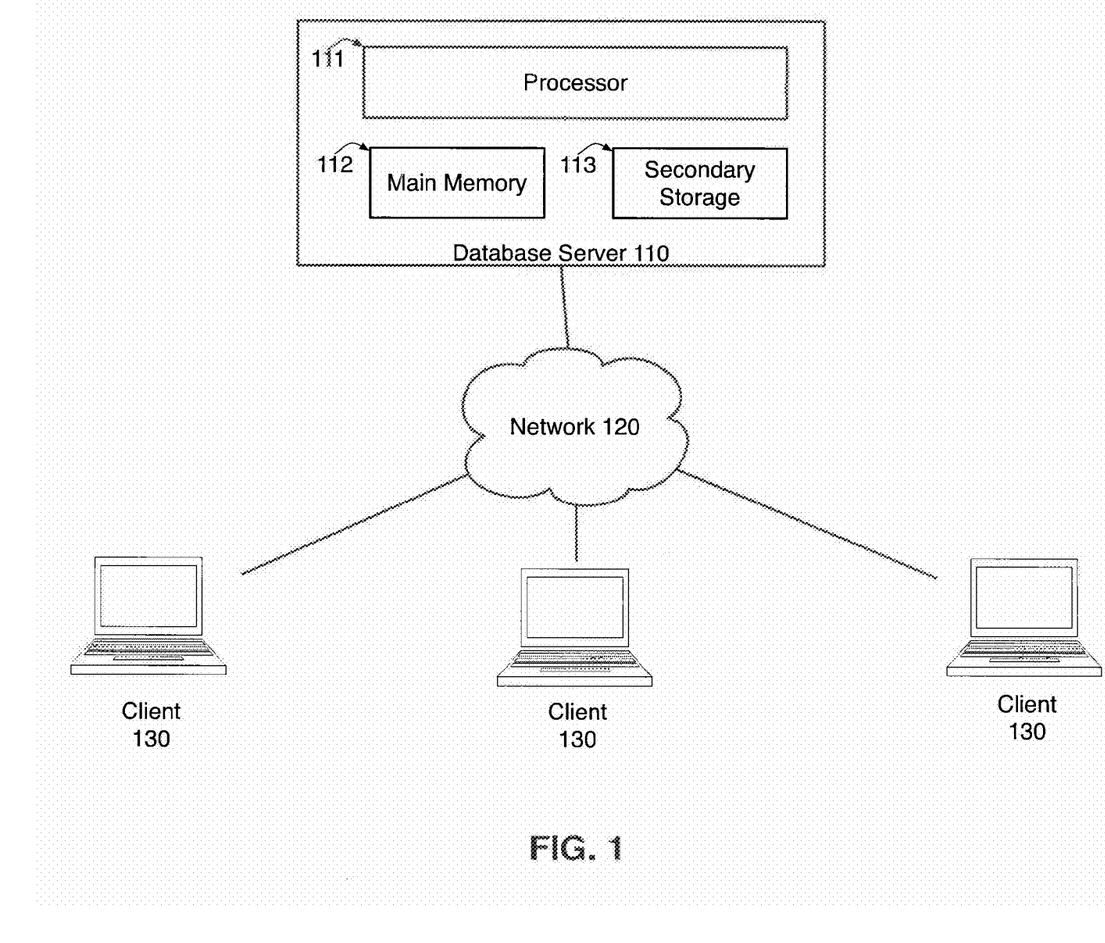
FIG. 1 is a diagram illustrating a database system, in accordance with an exemplary embodiment.

FIG. 1 is a diagram illustrating a system 100 in accordance with an embodiment. System 100 includes database server 110. Database server 110 may be, in one embodiment, a database server running database management server software such as Sybase IQ or SQL Anywhere from Sybase, Inc. of Dublin, Calif. Database server 110 may be implemented using at least one processor 111, and may also possess main memory 112 in the form of random access memory (RAM) and secondary storage 113, such as hard disk drive or solid-state drive storage. Database server may be used for one or more databases, each database having one or more tables.

As shown in FIG. 1, database server 110 is connected over a network 120 to one or more clients 130. Network 120, in one embodiment, is a local area network (LAN). Network 120 may be wired, wireless, or a combination of the two. In one embodiment, network 120 may also be a wide area network (WAN) such as the Internet.

Generally, users of the database system use clients 130 to connect to and access database server 110. Each user may have his or her own client 130, or multiple database users may share a client 130. In general, the database servers 110 can only be accessed by authorized users. Thus, each database user has some sort of authentication information, most typically a username and password, corresponding to the database user's account.

As described above, most database systems can be accessed by multiple users. Within that set of users, each user has a different set of permitted actions, i.e., each user is permitted, or possesses the privilege, to perform a set of actions. Properly managing permissions and privileges for database system users is vital to ensure the integrity, security, and performance of the database system.

Permissions and privileges correspond to individual functions used to manage the database. For example, one user may possess the privilege to create tables in the database. Other users may only be permitted to access tables to perform queries. Super users, as described above, may have the privilege to perform all functions in the database. Super users often perform managerial or administrative tasks, such as creating user accounts or resetting passwords. As noted above, however, to perform these tasks, the super user must always be present or accessible.

Some database systems use the concept of authorities to control access to the operations a particular database user is permitted to perform. Each authority controls a set of operations, and each user is assigned a particular authority. However, such a system may not provide granularity over the access to individual database functions. Thus, for example, granting a super user authority may provide a user with administrative access over the structure of the database (i.e. creating/dropping tables), as well as administrative access over other database users (i.e. resetting passwords, etc.). Some database systems require a single super user to administer all permissions and privileges. (e.g: in Sybase ASE, 'sa_role' is required to grant/revoke sa_role; sso_role is required for all roles except sa_role.)

The central concept behind role based access control is that permissions (or privileges) are associated with roles, and users are granted, or assigned to, appropriate roles. Role based access control facilitates security administration and review through levels of indirection. Roles can be created based on job functions and organizational requirements. For example, a role named IT_HELPDESK with the privilege to reset a user password may be created. Users assigned to particular roles are identified as those users that perform those job functions. Thus, in the example above, a helpdesk engineer may be granted the IT_HELPDESK role to perform associated tasks. While role definitions are relatively static (i.e., job functions do not often change), users assigned to those roles change frequently (due to promotion, leaving employment, or other factors). Role definitions can also evolve to meet the changing need of an organization. Roles are of two types: system roles, and user-defined roles.

Advanced role based access control concepts support the principle of least privilege. The principle of least privilege requires that all users in an information system (such as a database management system) should be granted as few privileges as required to perform their duties. Thus, extraneous privileges like resetting passwords are only granted to those users that absolutely require such privileges. Role based access control also supports the principle of separation of duties. The principle of separation of duties requires that, for particular sets of operations, no single individual is permitted to execute all operations within the set. For example, one user may be permitted to create tables in the database, but that same user cannot destroy tables.

Role based access control also allows roles to be arranged in arbitrarily deep role hierarchies. Moreover, roles may be configured to be mutually exclusive. In one embodiment, role administrators may grant and revoke role membership, without having the privilege to create new roles or without having the privilege to assign new permissions to the roles they administer.

Some embodiments described herein support the principles of least privilege, and separation of duties. Moreover, some embodiments described herein provide methods and systems for creating new permissions and permission sets to enable flexibility in delegating administrative tasks. Accordingly, a super user may not be needed in some embodiments, thereby creating a fully autonomous system with no single super user.

System Privileges

In an embodiment, all privileged operations in the database server are subdivided into functionality based atomic subsets, defined as system privileges. A privileged operation is an operation that requires some level of authentication or authorized access. Each system privilege is small enough to classify as a distinct set of tasks that a person or user may be granted the authority to perform. System privileges cannot be dropped, and also cannot own database objects. Moreover, system privileges cannot be modified, aside from the MANAGE ROLES and UPGRADE ROLE privileges, further explained below.

System Roles

To support the fine-grained access control of role based access control, in one embodiment, each privileged operation in the database system is vested in one system role. Accordingly, granting a system privilege is equivalent to granting the system role, and vice versa. In an embodiment, system roles are built-in roles that are automatically created in each newly created database.

In an embodiment, two categories may exist within the set of system roles:

standalone system roles, and system roles corresponding to system privileges. In one embodiment, standalone system roles are used to maintain the integrity of a database system. Such system roles are created with "MANAGE ROLES" as the sole role administrator, described further below. Thus, any user granted the MANAGE ROLES role can perform administrative functions for the standalone system roles. In one embodiment, the administrator of such roles cannot be modified. Standalone system roles may include, but are not limited to, the PUBLIC, SYS, DBO, rs_systabgroup, SYS_AUTH_REMOTE_DBA, SYS_SPATIAL_ADMIN_ROLE, diagnostics, and SA_DEBUG system roles.

By contrast, system roles corresponding to system privileges provide grantable access to a predefined set of system operations. System roles corresponding to system privileges also provide control over how privileges are granted and propagated. In one embodiment, the set of all privileged operations is divided into small subsets that can be individually granted to users and roles in the database. Granting and revoking such system roles corresponding to system privileges thus grant or revoke the ability, for example, to create database tables and other system operations.

Each system privilege has a corresponding predefined system role associated with it. System privileges can be granted or revoked without reference to the underlying specific system roles, thus, granting a system privilege is semantically equivalent to granting its associated system role. Accordingly, in one embodiment, the administration functionality available for roles is also applicable for system privileges. As used herein, references to roles also imply system privileges, since each system privilege has an associated system role.

The initial set of system privileges may be determined by analyzing operations that require an authority. Additional system privileges may be added in as they become necessary. The decision to create a new system privilege may be based on database server as well as user requirements. Users cannot create new system privileges. Rather, new system privileges may be added by a database system vendor based on new feature or customer requirements.

In one embodiment, each system role has a role administrator. The role administrator grants and revokes roles to other roles and users, and also has the ability to destroy the role. Such exclusivity is needed to enforce a flexible and powerful mechanism for supporting the separation of roles. A role administrator can be appointed as part of role creation, if desired. Once a role has been created, additional role administrators can be appointed and existing ones can be removed.

Initially, the administration and authority of each individual system privilege in a brand new database may be vested in two predefined system roles. The first predefined system role, SYS_AUTH_SA_ROLE, is granted system privileges that are generally entrusted to individuals tasked with data and system administrative responsibilities (i.e., creating tables, altering tables, backing the database up, etc.). The second predefined system role, SYS_AUTH_SSO_ROLE, is granted system privileges that are generally entrusted to individuals tasked with security and access control responsibilities (i.e. managing users, changing passwords, etc.). These two roles may be granted to a single predefined system role SYS_AUTH_DBA_ROLE, which is in turn granted to a seed database user 'DBA' with administrative privileges. In one embodiment, once a role hierarchy is created as described herein in accordance with organizational requirements, the initial role hierarchy can be dropped. Additionally, the seed database user can also be dropped.

As described above, system privileges may be created with any new database. One such system privilege is the MANAGE ROLES system privilege. This privilege is required to create a new user-defined role in the database system. Additionally, users with the MANAGE ROLES system privilege are the default administrators of all newly-created roles. Such users may only be granted administrative control over the role, and not be granted the ability to perform the functions associated with the role, as will be described below. Thus, by default, all user-defined roles can be administered by global role administrators.

A user creating a new role can optionally delegate administration of the role to another entity (i.e. user or role) instead of the default MANAGE ROLES administrator. A current administrator of a role is permitted to revoke the role from another administrator, including revoking the role from the system privilege MANAGE ROLES, thereby revoking the ability of global role administrators to administer the specific role. However, revoking the role from any administrator requires that the role be left with a minimum number of administrators, as will be described below.

Another such system privilege is the UPGRADE ROLE system privilege.

In one embodiment, the UPGRADE ROLE system privilege is the default administrator of all new system privileges added in future versions of a database system. This prevents any new system privileges from being without an administrator, if a super user is not present.

User Defined Roles

In one embodiment, in addition to system roles, user defined roles can be created. User defined roles can be granted multiple system and object privileges, and granting the role to a particular user grants that user all privileges contained in the role.

As with system roles, each user-defined role in a database system must have a role administrator. Similarly, as with system roles, a role administrator for a user-defined role has the exclusive right to grant and revoke the role to other users and roles, and to destroy the role. The role administrator can be a user or a role.

Creation of User Defined Roles

Roles can be created as new physical objects. Roles are separate logical entities, which do not have owners. That is, roles are global database objects. In one embodiment, all operations creating, dropping, granting, or revoking a role are audited.

To create a role, the syntax may appear as follows: CREATE [OR REPLACE] ROLE <role name> [ WITH ADMIN [ONLY] <admin> [, . . . ]]. Thus, to create a role, the user creating the role must specify at least the role name. Moreover, the user creating the role can also specify administrators for the role.

A database user creating a role has no direct authority over the role once created. However, the user creating the role must have the MANAGE ROLES system privilege, giving the user indirect authority to administer the new role, unless the indirect authority is removed using the WITH ADMIN or WITH ADMIN ONLY option of the CREATE ROLE statement, as will be described below.

As noted above, a user must have been granted the MANAGE ROLES system privilege to create a role. In the above syntax, if the OR REPLACE clause is used, and the role already exists in the database, the user must have administrative privileges over the specific role (as that role is to be replaced), apart from the MANAGE ROLES system privilege.

In the above syntax, the name of the new role (i.e. <role name>) is required to be unique across all users and roles in the database.

If the OR REPLACE clause is not used, the role being created must not already exist in the database. If the OR REPLACE clause is used and the role already exists, then the existing role is left intact but its current administrators are replaced with those specified on the statement being executed.

If the role admininstrator list is not specified, then by default, the WITH ADMIN ONLY clause is used, and the default administrator for the created role is set to the MANAGE ROLES role. If the WITH ADMIN clause is specified, then each element of the <admin> list must be the name of an existing role or user. Otherwise, the operation may fail. Additionally, the database must contain a minimal number of users that can login that have been granted the administrative role.

Otherwise, the operation will fail. This minimum number of administrative users is described further below.

The WITH ADMIN ONLY clause is further described below. If this clause is specified or implied, then the role creation operation grants only the administrative privileges of the role, without being granted the underlying operational privileges of the role being granted. In other words, the user can grant, revoke and drop the new role, but cannot exercise the privileges of the role.

The WITH ADMIN ONLY clause allows someone to administer a role without being able to exercise the role themselves even though they can grant the role to themselves and then exercise its privileges. This clause also makes the idea of global role administrator acceptable, even given the principle of least privilege and separation of duties. Because the only authorized functions the global role administrator can perform include administering roles, as opposed to actually using the privileges of various roles (as with other types of super users), the global role administator does not have complete control over the functions of the database system.

Granting Roles

In one embodiment, one or more privileges or roles may be granted to a user with various administrative options using specific syntax. To grant a system privilege or role, the syntax may appear as follows: GRANT system-priv-or-role TO <grantee>[, . . . ] [{WITH NO ADMIN|WITH ADMIN [ONLY]} OPTION] system-priv-or-role: <system_priv granted> [, . . . ]|ROLE <role granted> [, . . . ].

In the above syntax, each entry in the system_priv granted portion of the syntax must be the name of a system privilege. Further, if the role granted portion of the syntax is used, each role must be the name of an existing role. Also, each grantee must be the name of an existing user or user-defined role. If no option is specified, the WITH NO ADMIN OPTION is used by default.

As noted above, the syntax to grant administrative access to a role provides varying levels of flexibility. One option uses the syntax "WITH NO ADMIN OPTION". A user granted a role using the "WITH NO ADMIN OPTION" syntax is granted the functionality of the role, i.e., the user can perform the functions of the role, but the user cannot administer the role (i.e. grant/revoke the role to/from others or drop the role).

A second option uses the WITH ADMIN OPTION syntax. A user granted a role using this syntax can perform the functionality of the role and can administer the role. A third option, in accordance with one embodiment, uses the WITH ADMIN ONLY OPTION syntax. A user granted a role using this syntax cannot perform the functionality of the role. However, the user can only administer the role, by granting or revoking the role to or from other users or roles.

Together, the three grant options using the above syntax provide the ability to introduce the separation of duties principle, in accordance with one embodiment.

Figure 2:
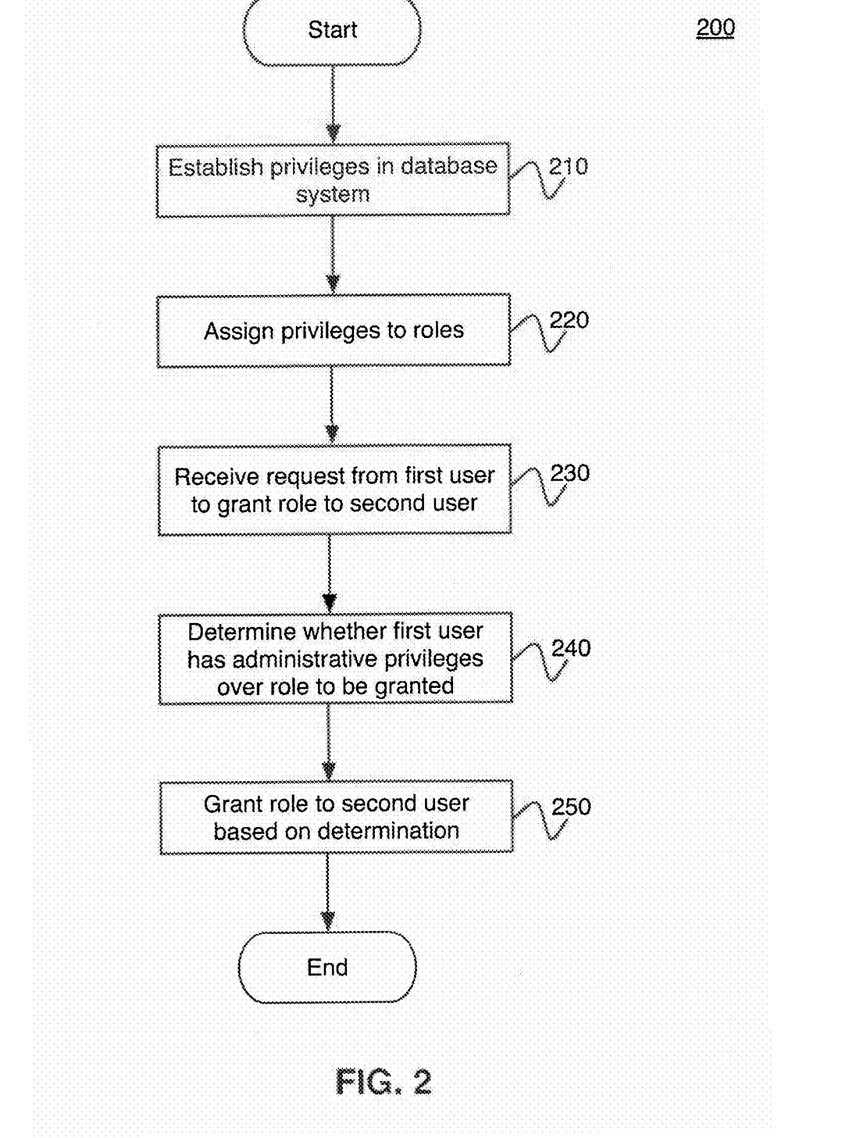
FIG. 2 is a flow diagram illustrating a method for granting a role, in accordance with an embodiment.

FIG. 2 is a flow diagram of a method 200 for granting a role to a user, in accordance with one embodiment. Although method 200 describes granting a role to a user, similar steps can be used to revoke a role from a user or modify a user's access to a role. Method 200 may be implemented by, for example and without limitation, database server 110 of FIG. 1. Method 200 begins at step 210.

At step 210, one or more privileges are established in a database system. For example, as described above, system privileges corresponding to each privileged or administrative function in a database system may be established. Thus, system privileges for such tasks as creating tables, dropping tables, creating user accounts, and other administrative functions are established in a database system.

At step 220, each system privilege is assigned to one or more roles. As described above, each system privilege could be represented as a system role. In addition, each system privilege can be assigned to one or more user-defined roles.

At step 230, a request is received from a first user (e.g. asmith) to grant a role to a second user (e.g. bjones). In one embodiment, the first user makes the request in the form of the syntax described above. For example, user asmith may specify that the create table privilege is to be granted to user bjones. However, the request is not limited in this manner. In one embodiment, the request includes the name of the role to be granted to the second user. In one embodiment, the request may include the name of the privilege to be granted to the second user, as granting the privilege is semantically equivalent to granting the role. The request may also include an instruction to grant administrative privileges for the specified role to the second user. If the request includes an instruction to grant administrative privileges, the instruction to grant administrative privileges may specify that only administrative privileges are granted to the second user (i.e., using the WITH ADMIN ONLY option).

At step 240, a determination is made as to whether the first user possesses administrative privileges over the role to be granted. In one embodiment, the first user may have been previously granted the specified role using the WITH ADMIN OPTION syntax. In one embodiment, the first user may have been previously granted to specified role using the WITH ADMIN ONLY OPTION syntax, and thus, the first user has the ability to grant the role to others, but not to perform the role.

At step 250, if the first user has administrative privileges over the role, based on the determination at step 240, the role is granted to the second user. The second user can then perform the actions associated with the role. Alternatively, if the first user does not have administrative privileges over the role, an error message may be provided.

Revoking Roles/Role Administrators

In one embodiment, a system privilege or role can be revoked from a current grantee. Revoking a role may use the following syntax: REVOKE [ ADMIN OPTION FOR ] system-prix-or-role FROM <grantee> [, . . . ] system-priv-or-role: <system_priv revoked> [, . . . ]|ROLE <role revoked>[, . . . ]. Each grantee is the name of an existing user or a modifiable role (user-defined role), thus, roles can be revoked from either users or other roles. Each system_priv revoked is the name of a system privilege, while each role revoked is the name of an existing role.

If the ADMIN OPTION FOR clause is used, then each system or role revoked must previously have been granted to each grantee with administrative privileges. The effect of this clause is to only revoke the administrative privileges of the role. If a grantee had previously been granted standard access to the role, that access will not change. Further, the user executing the statement must have administrative privileges over each system privilege or role revoked.

One potential complication introduced with the principle of least privilege and principle of separation of duty is that, without the careful revoking of administrative roles or dropping of roles, certain roles may become orphans. An orphaned role is one without any administrators. Thus, if a particular user is the only administrator of a certain role, and that user is either dropped from the database system, or the user's administrative privileges are revoked for that role, there will be no other user with the ability to administer the role. This is particularly problematic when there is no super user in the system.

Thus, in accordance with one embodiment, an option may be provided in the database system that sets a minimum number of role administrators (min_role_admins). By default, the minimum number of role administrators may be set to one. In one embodiment, the minimum number may be set to two, or any other integer. If a change made to a role (i.e., when a role is revoked from a user/role, or when a role is dropped entirely) causes the number of administrators for the role to fall below the minimum number of role administrators, the operation will fail, Such functionality ensures that no role or privilege is left without an administrator at any time. This may be particularly useful when the database system does not have a super user with the ability to perform each privilege. in one embodiment, the min_role_admins value may be set globally for the database. in a further embodiment, the min_role_admins value may be set per role, such that particular roles may have a greater minimum number of administrators.

In one embodiment, the min_role_admins value is verified when creating a role, revoking a role, and dropping a. user or role, The minimum number of administrators is also verified When changing a user's password to null (i.e, disabling the user's account) Changing a user's password to null effectively removes that user from being an administrator.

Figure 3:
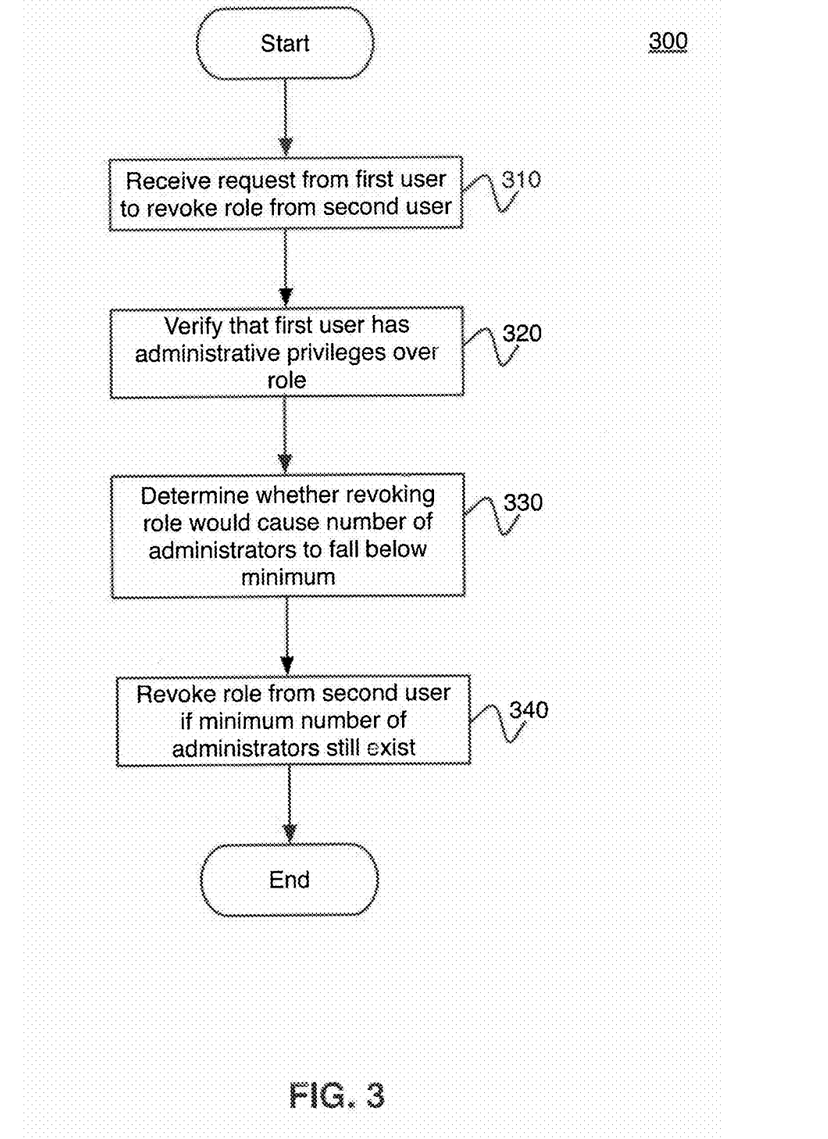
FIG. 3 is a flow diagram illustrating a method for revoking role administrators, in accordance with an embodiment.

FIG. 3 is a flow diagram of a method 300 for revoking a role from a user. Method 300 may be implemented by, for example and without limitation, database system 110. Method 300 begins at step 310.

At step 310, a request is received from a user (e.g., user asmith) to revoke a role from another user (e.g., user bjones). The request may use the syntax described above, and includes the name or account identifier of user bjones.

At step 320, the database system verifies that user asmith has administrative privileges over the specified role. In one embodiment, the database system may determine whether user asmith has full privileges (i.e. administrative and operational privileges), or only administrative privileges, as described above.

At step 330, if user asmith has administrative privileges, the database system determines whether revoking the role from user bjones would cause the number of administrators for the role to fall below a specified minimum number of administrators for the role. The determination may be performed by checking the min_role_admins value set globally for the database, or by checking the value set for that particular role.

At step 340, if revoking the role would not cause the number of administrators for the role to fall below the specified minimum number, the role is revoked from user bjones.

Alternatively, if revoking the role would cause the number of administrators to fall below the specified minimum number, the role is not revoked, and an error message may be provided. For example, the request to revoke may be rejected with an "insufficient number of administrative login users remaining" error.

In one embodiment, only users with non-null passwords are counted as administrators. In one embodiment, changes to the value of the min_role_admins option are allowed only if each role has at least those many numbers of administrators.

User-defined roles may also be dropped from the database system at any time. Dropping roles may use the following syntax: DROP ROLE <role dropped> [WITH {REVOKE|DROP OBJECTS}]. In the dropping roles syntax, the role dropped portion of the syntax must include the name of an existing user-defined role, and the user executing the statement must have administrative privileges over the role to be dropped. If the WITH REVOKE option is used, then the specified role can only be dropped if it does not own any objects. If the DROP OBJECTS option is used, then the specified role is revoked from all users or roles, and dropped along with its objects. If the objects cannot be dropped, the statement may fail with an error message.

Execution of the DROP ROLE statement requires that all dependent roles are left with the required minimum number of role administrators, as specified above.

Other Features

In one embodiment, an automatic unlocking feature may be provided for certain users possessing certain roles. For example, in a database management system, certain users have the privilege to unlock other users' accounts that have been locked due to mistyped passwords or other reasons. Inadvertently, the users having these privileges may also have their accounts locked for the same reasons. If the users having the ability to unlock accounts are the only users with such a privilege, the database may be completely locked down. Thus, in one embodiment, users with the privilege to unlock other accounts may automatically have their accounts unlocked after a configurable time period. The configurable time period may be based on a login policy option.

In one embodiment, the database system may have a login policy limit with a maximum number of failed login attempts allowed. A user is locked if the user exceeds the login policy limit. A locked user account can be manually unlocked via an alter user statement, which requires a "MANAGE ANY USER" privilege. As described above, if the only administrator of the "MANAGE ANY USER" system privilege is locked due to failed login attempts, the "MANAGE ANY USER" system privilege and potentially other roles will be orphaned. This could lead to a lockdown of some or all the services of a database In order to prevent this, in one embodiment, configurable login policy options for automatically unlocking user accounts that were locked due to failed login attempts may be provided. These configurable login policy options include a root_auto_unlock_time option and an auto unlock time option. The root_auto_unlock_time option controls how much time must pass before a user administrator (i.e., a user with the privilege to unlock other accounts) is automatically unlocked. The auto_unlock_time option controls how much time must pass before other user accounts are automatically unlocked. By default, the root_auto_unlock_time option may be set to a small value, such as 15 minutes, while the auto_unlock_time option may be set to unlimited. In one embodiment, a user with the "MANAGE ANY LOGIN POLICY" system privilege can configure both of the above mentioned unlocking time periods.

Figure 4:
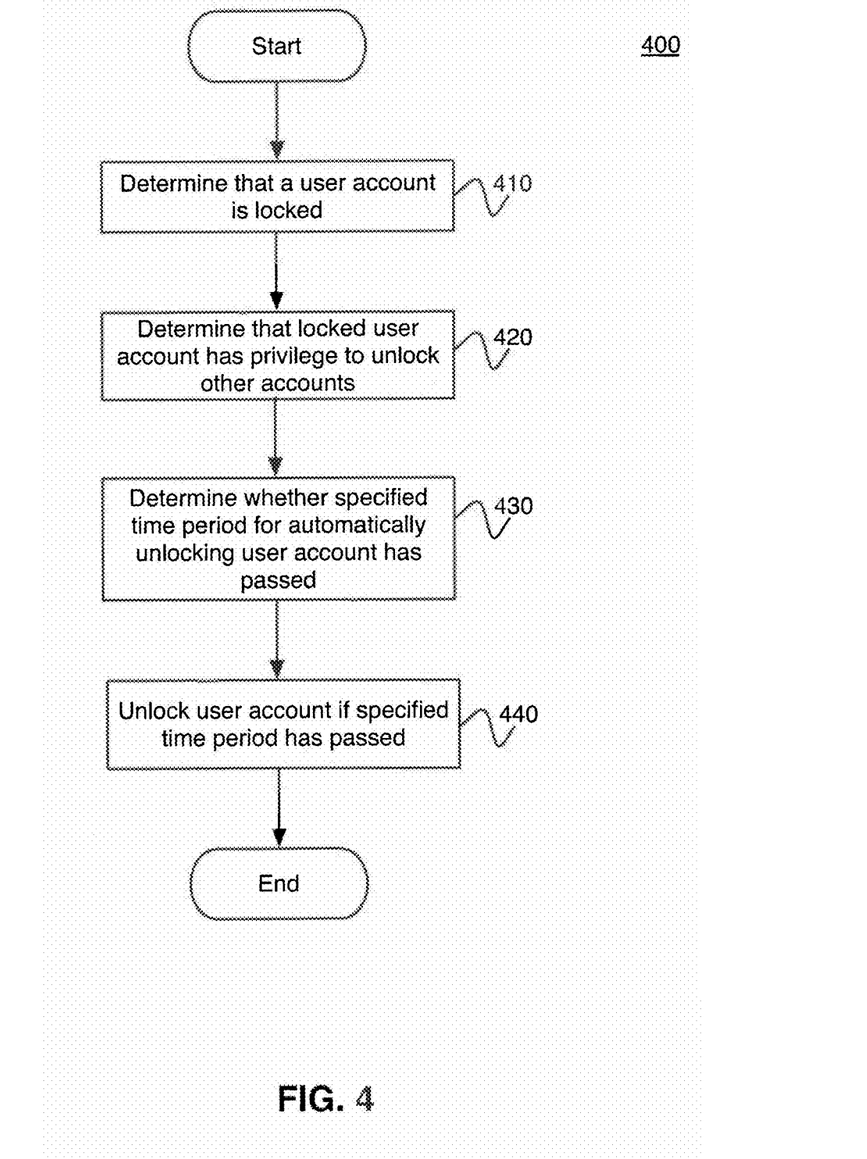
FIG. 4 is a flow diagram illustrating a method of automatically unlocking a user account, in accordance with an embodiment.

FIG. 4 is a flow diagram of a method 400 for automatically unlocking a user account, in accordance with an embodiment. Method 400 may be implemented by, for example and without limitation, database system 110. Method 400 begins at step 410.

At step 410, a determination is made that a user account is locked. This determination may be made by the database system, in response to detecting that the user account has entered in a number of incorrect passwords. Also, the user account may become locked if it is not used for a set period of time.

At step 420, a determination is made that the locked user account possesses the privilege to unlock other user accounts. This determination may be performed by inspecting the roles associated with the user account. In one embodiment, the determination at step 420 also identifies that the locked user account is the only user account with the privilege to unlock other user accounts.

At step 430, a determination is made as to whether a specified period of time has passed since the user's account has been locked. The time period may be specified by the root_auto_unlock_time option. If the requisite amount of time has passed, the user's account is unlocked at step 440.

Some users are granted the ability to impersonate another user's account.

This may be useful in the case of debugging or testing queries. However, impersonating other accounts may be a security risk.

Accordingly, in one embodiment, an attempt by a first user to impersonate another user's account is only granted if the first user already has all of the privileges or roles of the second user. Moreover, the first user must have the same or higher degree of grant for the roles of the second user. That is to say, if the second user has administrative privileges for a role, the first user must also have the administrative privileges before the database system will allow the first user to impersonate the second.

In one embodiment, the set of users that can be impersonated can be restricted. The list of users can be specified explicitly, or can be specified by way of a reference to certain roles. Thus, for example, users with those roles or a subset of those roles may be impersonated, while users with other roles cannot be. To grant the privilege to impersonate a user or a set of users (either explicitly or by reference to users having certain roles), the syntax may appear as follows: GRANT SET USER [(<target_user_list> |ANY [WITH ROLES <target_role_list>])] TO <grantee_list>.

Roles can also be used to restrict the set of users whose password can be changed by other users. The list of users can be specified explicitly, or, like the above, a set of roles can be specified. Thus, only users who have specific roles can have their passwords changed by an administrative user. To grant the privilege to change the password for a user or a set of users (either explicitly or by reference to users having certain roles), the syntax may appear as follows: GRANT CHANGE PASSWORD [(<target_user_list>|ANY [WITH ROLES <target_role_list>])] TO <grantee_list>.

In one embodiment, two or more roles can be defined as mutually exclusive. Accordingly, no user is permitted to possess both roles concurrently. This may ensure accidental or deliberate violation of the separation of duties principle does not occur.

In one embodiment, roles can be set up so that they do not automatically become effective when a user logs into the database. Instead, the user must take an explicit action in order to activate the role in the current session. Until the role is activated, the user is deemed not to possess the privileges of the role, as if the user has not been granted the role. This may be useful, as it allows the user session to execute with the minimal set of privileges needed to carry out the current task. Additionally, such a feature is useful when used in conjunction with the mutual exclusivity feature, as it allows mutually exclusive roles to be granted to the same user as long as the roles are not exercised concurrently.

In one embodiment, system privileges can be made more fine-grained by dividing the system privilege into multiple fine-grained privileges. Thus, for example, system privilege X can be divided into multiple fine-grained privileges X1, X2, and X3. Privilege X can be granted to users or roles, as described above, and further, the individual fine-grained privileges can also be granted to users and roles. This may permit even finer-grained control over privileges. For example, the system privilege CREATE ANY OBJECT allows a user to create multiple database object types (tables, views, procedures, functions, etc.). This could be further fine-grained by including separate system privileges for each object type, such as CREATE ANY TABLE, CREATE ANY VIEW, CREATE ANY PROCEDURE, CREATE ANY MATERIALIZED VIEW, etc.

Computer System

Figure 5:
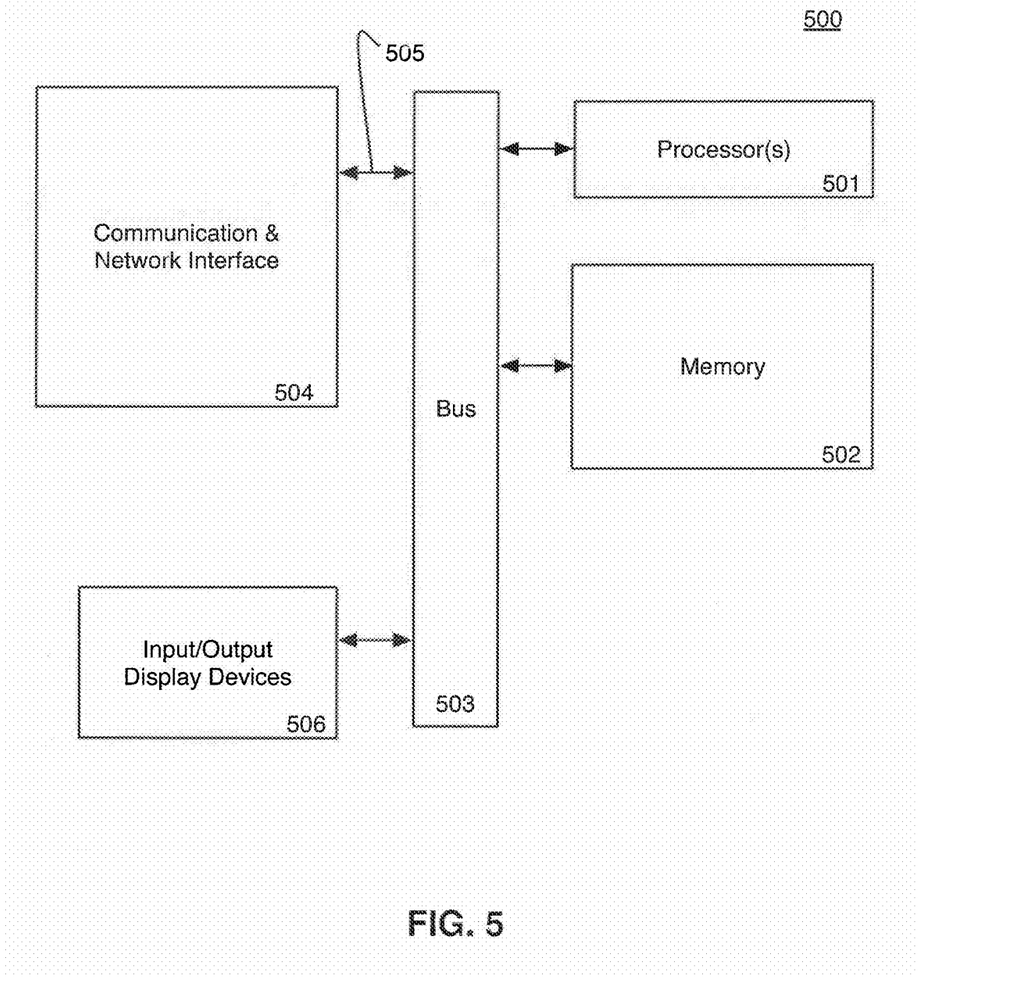
FIG. 5 is a diagram illustrating a computer system, in accordance with an exemplary embodiment.

Various aspects of the embodiments described above can be implemented by software, firmware, hardware, or any combination thereof. FIG. 1 illustrates a system 100 which may include one or more computer systems, including database system 110, in which embodiments, or portions thereof, may be implemented as computer-readable code. Various aspects of the embodiments are described in terms of an exemplary computer system 500. For example, database system 110 may be described in terms of being implemented using one or more computer systems 500.

FIG. 5 illustrates an exemplary computer system 500. Computer system 500 may thus include one or more processors 501. Processor(s) 501 may be a special purpose processor or a general purpose processor. Processor(s) 501 may be connected to communication infrastructure, such as, for example, a bus 503 and or network. Computer system 500 may further include memory 502, which may include random access memory (RAM) and may also include secondary memory. Secondary memory may include, for example, a hard disk drive, a removable storage drive, and or a memory stick. A removable storage drive may comprise a floppy disk drive, magnetic tape drive, optical disk drive, flash memory, or the like. As will be appreciated by persons skilled in the relevant arts, a removable storage unit includes a computer usable storage medium having stored therein computer software and/or data. According to some embodiments, secondary memory may include similar means for allowing computer programs or other instructions to be loaded into computer system 500 which may include, for example, a removable storage unit and associated interface. Examples include a program cartridge and cartridge interface (such as, for example, may be found in a video game device), a removable memory chip (such as, for example, an EPROM or PROM) and associated socket, and other removable storage units and interfaces which allow software and data to be transferred from a removable storage unit to computer system 500.

Computer system 500 includes a communications and network interface 504. Communication and network interface 504 may interface with remote sites, nodes, and or other networks via wired or wireless connections. Communication and network interface 504 enables computer system 500 to communicate over networks or mediums such as LANs, WANs the Internet, etc. Communication and network interface 504 may enable software and or data to be transferred between computer system 500 and external devices, nodes, and networks. Communications and network interface 504 may further include a modem, a communications port, a PCMCIA slot and card, or the like.

Software and data transferred via communications and network interface 504 may take the form of signals which may he electronic, electromagnetic, optical, or other signals capable of being received by communication and network interface 504. These signals are provided to communication and network interface 504 via a communication path 505. Communication path 505 carries signals and may be implemented using wire or cable, fiber optics, a phone line, a cellular phone link, an RF link or any other communications channels.

In this document, the terms "computer program medium" and "computer usable medium" and "computer readable medium" are used to generally refer to media such as a removable storage unit, a removable storage drive, and or a hard disk installed in a hard disk drive. Signals carried over communication path 505 may also embody the logic described herein. Computer program medium and computer usable medium may also refer to memories, such as memory 502, which may be memory semiconductors (e.g. DRAMs, etc,). These computer program products are means for providing software to computer system 500.

Computer programs (also called computer control logic) may be stored in memory 502. Computer programs may be executed by processor 501. Computer programs may also be received via communication and network interface 504 and executed locally, remotely, and or in a distributed manner utilizing the capabilities of computer system 500 to receive, store, process, and execute.

Such computer programs, when executed, enable computer system 500 to implement various embodiments discussed herein. Furthermore, such computer programs, when executed, enable processor 501 to implement the processes of embodiments, such as the steps in methods illustrated by flowcharts discussed. Thus, such computer programs may represent controllers of the computer system 500. Where an embodiment is implemented using software, such software may be stored in a computer program product and loaded into computer system 500 using a removable storage drive, interfaces, a hard drive, and or communication and network interface 504, for example.

Computer system 500 may also include input/output/display devices 506, such as keyboards, monitors, pointing devices, etc. Computer system 500 may interface with various device inputs and outputs ("I/O"), such as, for example, a display monitor, a keypad, or a touchscreen display, and any combination thereof. For example, computer system 500 may take the form of a personal computer, a mobile device, or any device having a display and processing capabilities.

Various embodiments are also directed to computer program products comprising software stored on any computer useable medium. Such software, when executed in one or more data processing device(s), causes a data processing device(s) to operate as described herein. Embodiments may employ any computer useable or readable medium, known now or in the future. Examples of computer useable mediums include, but are not limited to primary storage devices (e.g., such as any type of random access memory), secondary storage devices (e.g., such as hard drives, floppy disks, CD ROMS, ZIP disks, tapes, magnetic storage devices, optical storage devices, MEMS, nanotechnological storage device, etc.), and communication mediums (e.g., such as wired and wireless communications networks, local area networks, wide area networks, intranets, etc.).

Reading this description, it will become apparent to a person skilled in the relevant art how to implement these embodiments using other computer systems and/or computer architectures. Embodiments may further operate with software, hardware, and/or operating system implementations other than those described herein. Therefore, any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit in any way. Various embodiments are described herein with the aid of functional building blocks for illustrating the implementation of specified functions and relationships thereof, The boundaries of these functional building blocks have been arbitrarily defined herein for the convenience of the description. Alternate boundaries can be defined so long as the specified functions and relationships thereof are appropriately performed.

The foregoing description of the specific disclosed embodiments will so fully reveal the general nature of the disclosed embodiments that others can, by applying knowledge within the skill of the art, readily modify and/or adapt for various applications such specific embodiments, without undue experimentation. Therefore, such adaptations and modifications are intended to be within the meaning and range of equivalents of the disclosed embodiments, based on the teaching and guidance presented herein. It is to be understood that phraseology or terminology is for the purpose of description and not of limitation, such that the terminology or phraseology of the specification is to be interpreted by the skilled artisan in light of the teachings and guidance.

The breadth and scope of the disclosed embodiment should not be limited by any of the above-described exemplary embodiments, but should be defined only in accordance with the following claims and their equivalents.

What is claimed is:

1. A computer-implemented method, comprising:
   establishing one or more privileges in a database system, each privilege controlling access to an administrative function for the database system;
   assigning each privilege to one or more roles;
   receiving a request from a first user to grant a role to a second user;
   determining whether the first user has administrative rights over the role;
   granting the role to the second user when the first user is determined to have administrative rights over the role;
   receiving a request from the first user to revoke a role from a third user;
   determining whether the first user has administrative rights over the role;
   determining whether revoking the role from the third user would result in the role not having a threshold number of administrators; and
   revoking the role from the third user when the first user is determined to have administrative rights over the role and when the role is determined to have at least the threshold number of administrators after revoking the role from the third user.

2. The method of claim 1, wherein the determining further comprises determining whether the first user has been granted only administrative rights over the role.

3. The method of claim 1, wherein the request includes an instruction to grant administrative rights to the second user.

4. The method of claim 3, wherein the instruction to grant administrative privileges specifies that only administrative rights are to be granted to the second user.

5. The method of claim 1, wherein the threshold number of administrators is set at a global level or a role-specific level.

6. The method of claim 1, wherein the first user is an administrative user, and further comprising:
   determining that the administrative user's account has been locked;
   determining that the administrative user has been assigned a role allowing the administrative user to unlock other accounts;
   if the administrative user has been assigned the role allowing the administrative user to unlock other accounts, determining whether a configured time period has passed since the administrative user's account has been locked; and unlocking the administrative user's account if the configured time period has passed.

7. The method of claim 1, further comprising:
receiving a request from the first user to grant a change password privilege for an entity to the second user, wherein the entity includes one of a set of users, a set of users possessing a subset of a specific set of roles, or all users;
determining whether the first user has administrative rights over the change password privilege; and
granting the privilege to the second user when the first user is determined to have administrative rights over the change password privilege.

8. The method of claim 1, further comprising:
receiving a request from the first user to grant an impersonation privilege for an entity to the second user, wherein the entity includes one of a set of users, a set of users possessing a subset of a specific set of roles, or all users;
determining whether the first user has administrative rights over the impersonation privilege; and
granting the privilege to the second user when the first user is determined to have administrative rights over the impersonation privilege.

9. A system, comprising:
one or more processors; and
memory, the memory storing instructions that, when executed by the one or more processors, cause the one or more processors to:
establish one or more privileges in a database system, each privilege controlling access to an administrative function for the database system;
assign each privilege to one or more roles;
receive a request from a first user to grant a role to a second user;
determine whether the first user has administrative rights over the role;
grant the role to the second user when the first user is determined to have administrative rights over the role;
receive a request from the first user to revoke a role from a third user;
determine whether the first user has administrative rights over the role;
determine whether revoking the role from the third user would result in the role not having a threshold number of administrators; and
revoke the role from the third user when the first user is determined to have administrative rights over the role and when the role is determined to have at least the threshold number of administrators after revoking the role from the third user.

10. The system of claim 9, wherein the memory further stores instructions that cause the one or more processors to determine whether the first user has been granted only administrative rights over the role.

11. The system of claim 9, wherein the request includes an instruction to grant administrative rights to the second user.

12. The system of claim 11, wherein the instruction to grant administrative privileges specifies that only administrative rights are to be granted to the second user.

13. The system of claim 9, wherein the threshold number of administrators is set at a global level or a role-specific level.

14. The system of claim 9, wherein the first user is an administrative user, and wherein the memory further stores instructions that cause the one or more processors to:
determine that the administrative user's account has been locked;
determine that the administrative user has been assigned a role allowing the administrative user to unlock other accounts;
if the administrative user has been assigned the role allowing the administrative user to unlock other accounts, determine whether a configured time period has passed since the administrative user's account has been locked; and
unlock the administrative user's account if the configured time period has passed.

15. A non-transitory computer-readable storage medium having instructions stored thereon, the instructions when executed causing at least one computing device to perform operations, the operations comprising:
establishing one or more privileges in a database system, each privilege controlling access to an administrative function for the database system;
assigning each privilege to one or more roles;
receiving a request from a first user to grant a role to a second user;
determining whether the first user has administrative rights over the role;
granting the role to the second user when the first user is determined to have administrative rights over the role;
receiving a request from the first user to revoke a role from a third user;
determining whether the first user has administrative rights over the role;
determining whether revoking the role from the third user would result in the role not having a threshold number of administrators; and
revoking the role from the third user when the first user is determined to have administrative rights over the role and when the role is determined to have at least the threshold number of administrators after revoking the role from the third user.

16. The non-transitory computer-readable storage medium of claim 15, wherein the determining further comprises determining whether the first user has been granted only administrative rights over the role.

17. The non-transitory computer-readable storage medium of claim 15, wherein the request includes an instruction to grant administrative rights to the second user.

18. The non-transitory computer-readable storage medium of claim 17, wherein the instruction to grant administrative privileges specifies that only administrative rights are to be granted to the second user.

* * * * *